Oct. 13, 1953 K. S. STANBURY 2,655,557

APPARATUS FOR USE IN TELEPHONE OR LIKE COMMUNICATION SYSTEMS

Filed Nov. 30, 1948 3 Sheets-Sheet 1

INVENTOR
KEITH S. STANBURY
BY: Young, Emery & Thompson Attys.

Oct. 13, 1953 K. S. STANBURY 2,655,557

APPARATUS FOR USE IN TELEPHONE OR LIKE COMMUNICATION SYSTEMS

Filed Nov. 30, 1948 3 Sheets-Sheet 2

INVENTOR
KEITH S. STANBURY
BY Young, Emery & Thompson
ATTYS.

Oct. 13, 1953 K. S. STANBURY 2,655,557

APPARATUS FOR USE IN TELEPHONE OR LIKE COMMUNICATION SYSTEMS

Filed Nov. 30, 1948 3 Sheets-Sheet 3

INVENTOR
KEITH S. STANBURY
By: Young, Emery & Thompson
Att'ys.

Patented Oct. 13, 1953

2,655,557

UNITED STATES PATENT OFFICE 2,655,557

APPARATUS FOR USE IN TELEPHONE OR LIKE COMMUNICATION SYSTEMS

Keith Simmons Stanbury, Christchurch, New Zealand

Application November 30, 1948, Serial No. 62,642
In New Zealand December 22, 1947

3 Claims. (Cl. 179—1)

Figure 1:
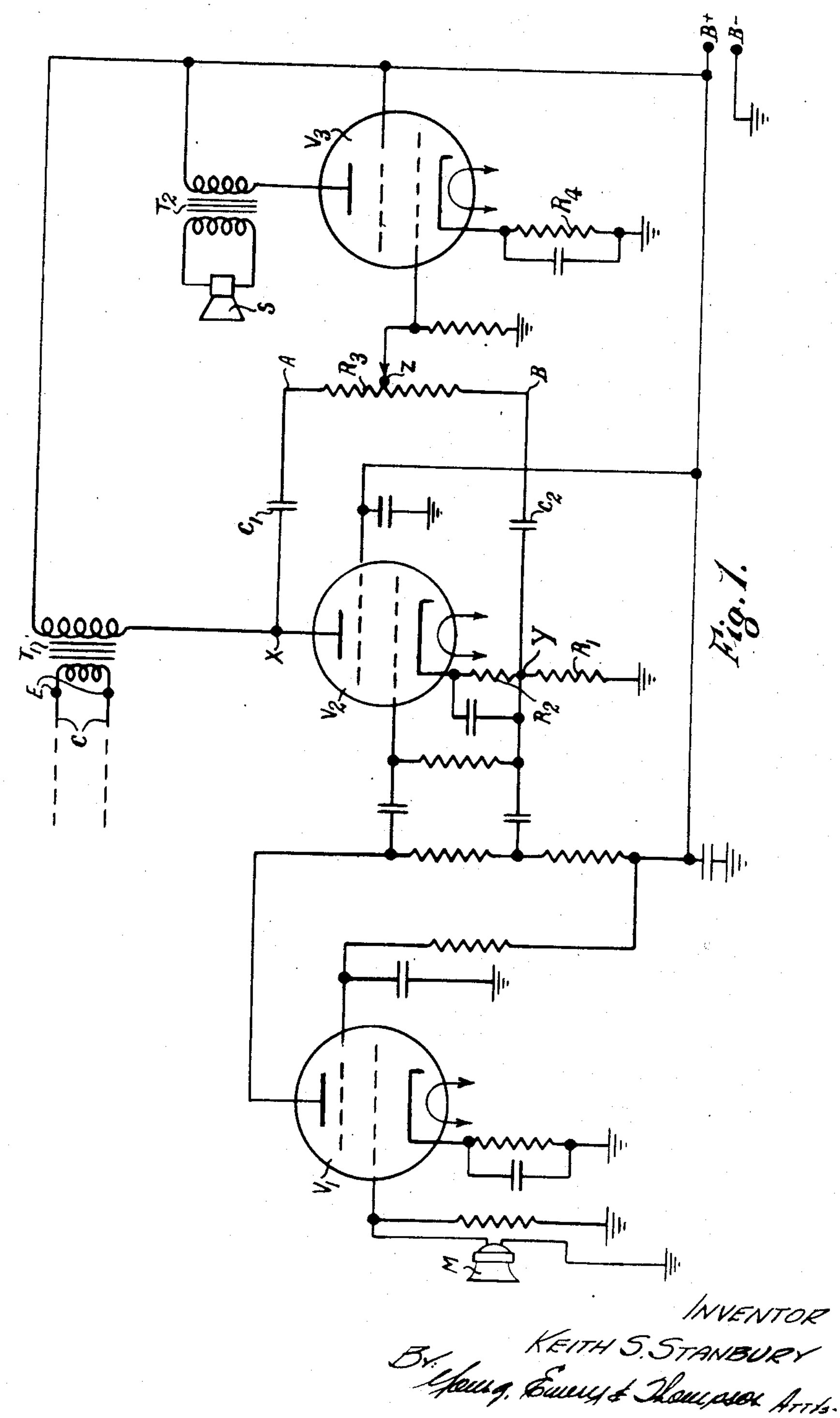

This invention relates to telephone or like communication systems for providing two-way communication over a single channel, such for example as a single pair of conductors. The invention is concerned with systems of the kind in which there are provided a signal source, such for example as a microphone, and a signal reproducing device, such for example as a loudspeaker, in which it is desired that the signal source should be capable of passing signals into the channel and that the channel should be capable of passing signals to the signal responsive device.

It is a known disadvantage of many forms of inter-communication telephone systems, such as are installed in business houses and the like for speaking through a microphone and a loudspeaker from one department or office to another, that a two-way conversation cannot be carried on without the manual operation of a switch which in effect allows only one-way conversation in the direction as controlled by the operation of the switch.

The disadvantage arises, as is known, from the fact that if the switch were omitted and if therefore the transmitting and receiving circuits remained permanently operative, there would be a risk of what is known as "singing round," that is to say positive feed-back of energy from the loudspeaker to the microphone, which would cause such distortion or continuous oscillation as would prevent the use of the system. Where considerable amplification has to be provided and where the microphone and loudspeaker are not widely spaced (and these conditions often exist in practice) "singing round" has been inevitable in the absence of a switch.

The present invention has for its object to enable two-way communication to be carried out over a single transmission channel without the need to manipulate a switch according to the direction of transmission.

The principal object of this invention is to provide means which will enable a two-way conversation to be carried on over an inter-communcation system including a microphone and an adjacent loudspeaker without a switch having to be operated by the speaker before receiving an answer, so that two persons conversing over the system may speak to one another in the same way as over a telephone: that is to say what may be described as "simultaneous" two-way conversation can be carried on.

According to the present invention, in apparatus of the kind specified, there is provided a circuit arrangement for maintaining an operative coupling between terminals for connection to the transmission channel and the said signal responsive device and between the said signal source and the said terminals whilst avoiding substantial coupling between the said signal source and the said signal responsive device.

The circuit arrangement may comprise an impedance, which is preferably purely resistive, connections for developing opposite potential variations between points on the impedance in response to signals from said source, a coupling between the said terminals and one of the said points and a coupling between a tapping on said impedance and the signal responsive device, the said tapping being so chosen that the potential variations thereat in response to signals from said source are negligibly small.

Since this invention will enable a "simultaneous" two-way conversation to be carried on through a microphone and a loudspeaker, it may also be connected into a normal telephone system. As a result, it is possible to carry on a telephone conversation over the normal telephone system by having a microphone suitably located on a desk in an office, so that it will pick up conversation within its normal range, and a loudspeaker suitably located in the office so that speech is received at normal conversation level. The advantages of this are many. For instance, any person carrying on a telephone conversation is freed from having to hold the telephone handset, and has both hands free to write, handle papers and suchlike. Also the speaker can walk about the room for instance to get documents from a drawer, and can continue the telephone conversation. In addition several parties in a room may take part in a conversation with the party or parties at the other end of the line. It also saves time of a person using the telephone since he does not have to hold the handset while waiting for a call to answer, or while waiting for the party called to come to the telephone.

Figure 2:
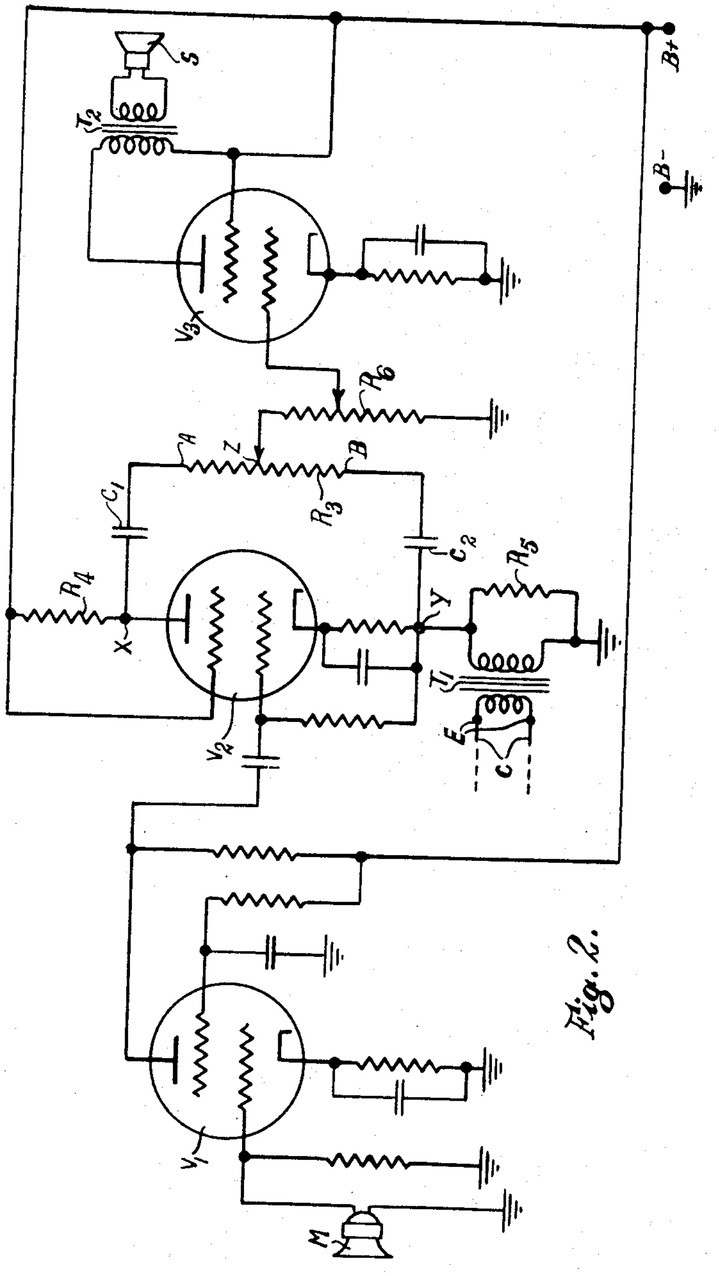
Figure 3:
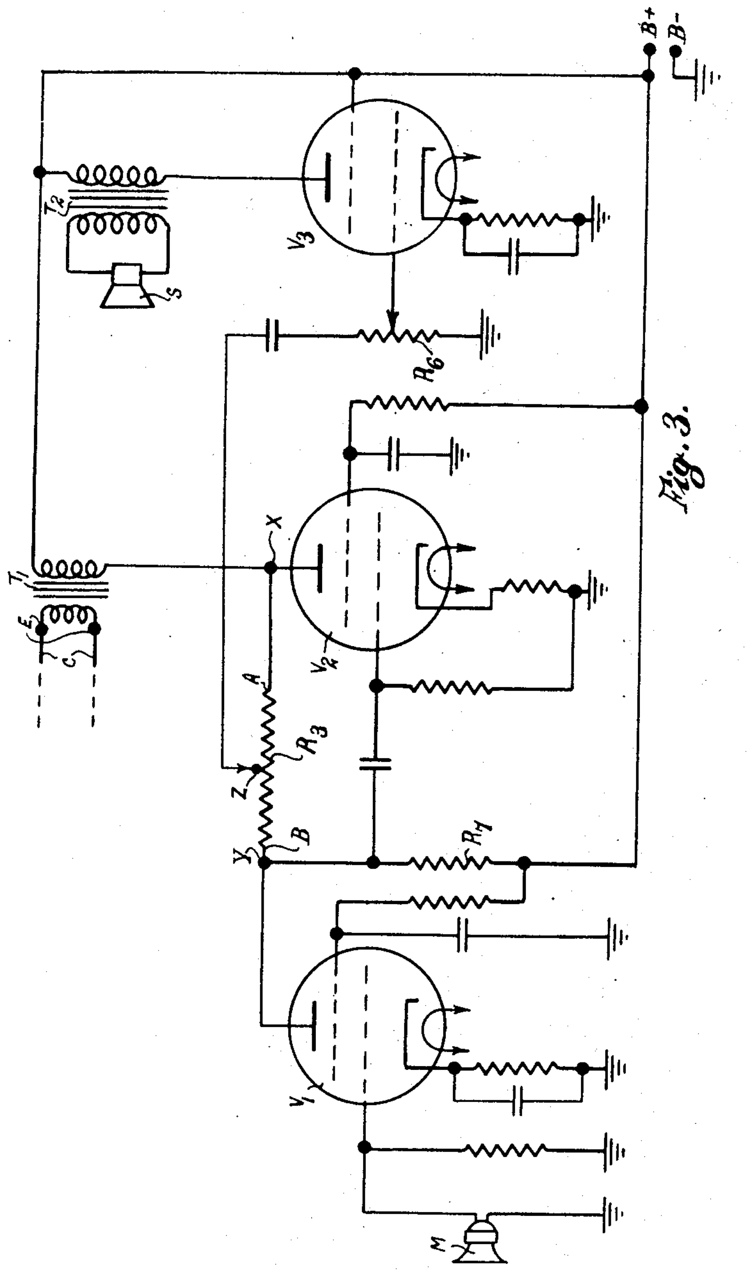

Other features of the invention will be apparent from the following description of three embodiments thereof which will be given with reference to the accompanying drawings, each figure of which is a circuit diagram of one in which Figure 1 shows an embodiment of the invention in which the line is coupled in the anode circuit of a valve and in which the balancing resistor is connected between the anode and cathode of the valve, Figure 2 shows a modification of Figure 1 in which the line is coupled in the cathode circuit of a valve, and Figure 3 shows a further embodiment of the invention in which the balancing resistor is connected between the anodes of two valves. Like parts in the figures are given the same references.

Referring to Figure 1, a microphone M is coupled by way of a microphone amplifier including a valve $V_1$ to the control grid-cathode circuit of a second valve $V_2$. This valve $V_2$ is arranged as a cathode and anode-loaded amplifier by a coupling method sometimes known as the "top and tail" method. Thus loads, which may be, but are not necessarily, approximately equal to one another, are connected in both the anode and the cathode circuits. The anode circuit load is provided by a communication channel C which can be connected to terminal E of a transformer $T_1$ having one winding connected to the anode of the valve $V_2$. The cathode load is constituted by a resistance $R_1$, a decoupled resistance $R_2$ being provided for bias purposes.

A point X which is connected to the anode of $V_2$ is connected through a condenser $C_1$ to a terminal A of a resistance $R_3$ the opposite terminal B of which is connected through a condenser $C_2$ to a point Y which is at cathode potential at signal frequencies. Space current for the valves $V_1$ and $V_2$ is supplied by a suitable source connected at B+ and B−, the latter being earthed.

It will be evident that when signals are developed at the microphone M the points A and B will assume potentials relative to earth which are 180° phase-displaced relatively to one another. There will therefore be a point Z along the resistance $R_3$, which may be called a neutral point, at which no potential variations relative to earth result from signals from the microphone M. If the anode and cathode loads are equal, as is preferred, the potential variations at A and B will be equal and opposite and the neutral point Z will be the electrical midpoint of the resistance $R_3$.

The point Z is connected to the grid of a further valve $V_3$, acting as loudspeaker amplifier, the cathode of which is earthed through a decoupled bias resistor $R_4$. The anode circuit of this valve contains a transformer $T_2$ feeding a loudspeaker S.

In operation, since potential variations between point X and earth are applied to the channel C through the transformer $T_1$, an operative coupling is maintained between the microphone M and the channel C, signals from the microphone being passed into the channel C. Moreover an operative coupling is maintained between the channel C and the input circuit of the valve $V_3$ through the transformer $T_1$, condenser $C_1$ and the upper part of the resistance $R_3$ whereby signals received along the channel C are reproduced by the loudspeaker S. In spite of this substantially no signals are passed from the microphone M to the valve $V_3$ and the loudspeaker S thus remains substantially unaffected by such microphone signals. Singing-round is thus prevented.

The channel C may evidently be the conductors of a normal telephone system or the conductors of an intercommunication system in a building for example.

Figure 2 differs from Figure 1 in that the transformer $T_1$ for coupling to the transmission channel C is in the cathode circuit of the valve $V_2$, the anode load being constituted by a resistance $R_4$. A resistance $R_5$, for example of 50,000 ohms, may be connected across the high impedance winding of the transformer $T_1$. In this embodiment the potential variations produced between the point Y and earth by signals from the microphone M are passed to the channel C. At volume control resistance $R_6$ may be provided to permit control of the output from the loudspeaker S.

It has been found in tests that under conditions of extreme variations in impedance of the transmission channel C, the circuit of Figure 2 is to be preferred to that of Figure 1.

In the embodiment of Figure 3, the valves $V_1$ and $V_2$ are coupled in cascade by any suitable means, such for example as the resistance-capacity coupling shown, as a normal two-stage amplifier. As is shown, the potentials relative to earth at the anodes of the two valves, that is at the points X and Y, arising from signals from the microphone M are in phase opposition and their relative magnitudes depend upon the amplification of the valve $V_2$. As before a neutral point Z can be found between X and Y at which the potential variations relative to earth arising from microphone signals are negligibly small. As in Figure 1 the point Z is connected to the input of the valve $V_3$ and the point X is connected to the transformer $T_1$. Potential variations in the grid circuit of the valve $V_3$ in response to signals from the microphone M are, therefore, negligible.

In this embodiment an operative coupling is maintained between the microphone M and the channel C through the valves $V_1$ and $V_2$, point X and the transformer $T_1$. The coupling from point Y through the resistance $R_3$ to the point X provides a voltage in anti-phase with respect to that previously mentioned derived through the valve $V_2$ but this anti-phase voltage can be made small enough not to prevent satisfactory operation by suitable choice of the value of a resistance $R_7$, connected between points Y and B, in relation to the value of $R_3$. An operative coupling is maintained between the channel C and the loudspeaker S through the transformer $T_1$, points X and Z and the valve $V_3$.

It will be obvious that the positioning of the microphone and loudspeaker in relation to each other is of importance. The degree of proximity of the microphone and loudspeaker without material distortion occurring may depend on the accuracy with which the balance point Z is adjusted. It has been found that if the microphone and loudspeaker are located about 4 feet or more apart there is a reasonable tolerance permissible in the adjustment of the point Z, so that the slight variations in the exact position of point Z that may occur in normal use of the apparatus will not affect the satisfactory operation of the apparatus.

Apparatus according to the invention has been tested under varying conditions of line impedances. It has been found that apparatus according to the circuits shown in Figures 2 and 3 respond satisfactorily to extreme variations in line impedances; but apparatus according to Figure 1 while operating quite satisfactorily under what are considered to be the normal variations of line impedances was found to "feed-back" to a material extent when subjected to extreme variations of line impedances; the balance point Z could be adjusted to overcome material "feed-back" under one extreme, but with the point Z so adjusted, the other extreme caused material "feed-back." It is emphasized, however, that under normal conditions the circuit shown in Figure 1 is considered to be a satisfactory arrangement.

In the apparatus according to this invention an adjustable balance may be provided so that a mechanic setting up or overhauling the apparatus may easily adjust the position of the neutral point Z.

It is pointed out that the transmitting volume of the apparatus is preferably fixed, but the receiving volume may be adjusted within the range of adjustment possible in an ordinary telephone conversation; if adjustment of the receiving volume above that range is attempted then material distortion may occur.

It will be obvious to anyone skilled in the art that there are a number of different types of valves which could be used for the purpose of the valve $V_2$ in Figures 1, 2 and 3, to produce the effect required.

It is obvious from the above circuit diagrams how the apparatus is connected to a suitable supply of electric power. A switch (not shown) can be provided for switching off the microphone when desired. Volume control may be provided on the loudspeaker. A switch may be provided to disconnect the power supply to the apparatus so that if an ordinary telephone is connected on the same communicating wires, it may be used in normal manner.

Arrangements as described above may be utilised to provide a two-way repeater amplifier for a telecommunication channel by arranging two sets of apparatus in back-to-back manner, i. e., with the (microphone) input of one set supplied from the (loudspeaker) output of the other set and vice versa. Further amplification may obviously be provided in either or both of said interconnections.

I claim:

1. A communication apparatus for use at one station for providing two-way communication over a two-wire single transmission channel between said station and another station, said apparatus comprising a transformer having primary and secondary windings, one of said windings being connected across the wires of said transmission channel, an amplifier including an amplifying tube having an anode, a control electrode, and a cathode, a circuit connecting the other winding of said transformer and a load resistance in series between said anode and said cathode, means connecting the circuit at a point between the transformer winding and said load resistance to ground, a signal source, a circuit coupling said source between the cathode and the control electrode of said amplifier tube whereby signals from said source are applied through said amplifier tube to said other winding of said transformer for transmission to said communication channel, a resistor, means including a condenser connecting one end of the resistor to the cathode and a condenser connecting the other end of the resistor to the anode of said amplifier tube, an adjustable tap on said resistor movable along the resistor between the ends thereof for selecting a point at which the potential variations with respect to ground are zero, a signal responsive device, an amplifier for said signal responsive device including an amplifier tube having a cathode, an input electrode and an anode, an input circuit connected between the input electrode and said cathode, and means connecting the input electrode of the amplifier tube of said signal responsive device amplifier to said resistor tap at the point where the potential variations are substantially zero relative to ground and means connecting the cathode of said last mentioned tube to ground for the transmission of signals from said channel through the transformer windings to said signal responsive device without the latter device responding to signals from said signal source.

2. A communication apparatus according to claim 1 in which the other winding of the transformer is connected at one end to the anode and the load resistance is connected at one end to the cathode, and the other ends of the other winding of the transformer and the load resistance are connected together.

3. A communication apparatus according to claim 1 in which the other winding of the transformer is connected at one end to the cathode and the load resistance is connected at one end to the anode, and the other ends of the other winding of the transformer and the load resistance are connected together.

KEITH SIMMONS STANBURY.

References Cited in the file of this patent

UNITED STATES PATENTS

| Number | Name | Date |
|---|---|---|
| 2,071,053 | Varley | Feb. 16, 1937 |
| 2,164,185 | Bertnolli et al. | June 27, 1939 |
| 2,199,220 | French | Apr. 30, 1940 |
| 2,336,888 | Reier | Dec. 14, 1943 |
| 2,341,539 | Giannini | Feb. 15, 1944 |
| 2,369,351 | Herrick | Feb. 13, 1945 |
| 2,516,776 | Johnson | July 25, 1950 |

FOREIGN PATENTS

| Number | Country | Date |
|---|---|---|
| 812,019 | France | Apr. 28, 1937 |